(12) United States Patent
Sotgiu

(10) Patent No.: US 8,171,790 B2
(45) Date of Patent: May 8, 2012

(54) APPARATUS FOR MEASURING FORCES GENERATED BY AN UNBALANCE OF A VEHICLE WHEEL

(75) Inventor: Paolo Sotgiu, Modena (IT)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 470 days.

(21) Appl. No.: 12/437,400

(22) Filed: May 7, 2009

(65) Prior Publication Data

US 2009/0277265 A1 Nov. 12, 2009

(30) Foreign Application Priority Data

May 7, 2008 (EP) .................................... 08008620

(51) Int. Cl.
*G01M 1/16* (2006.01)
(52) U.S. Cl. ............................... 73/462; 76/460
(58) Field of Classification Search .................. None
See application file for complete search history.

(56) References Cited

U.S. PATENT DOCUMENTS

| | | | | |
|---|---|---|---|---|
| 3,741,017 A | * | 6/1973 | Reiser | 73/480 |
| 3,824,862 A | | 7/1974 | Branick | |
| 3,911,751 A | * | 10/1975 | Shooter et al. | 73/464 |
| 4,014,139 A | * | 3/1977 | Shooter et al. | 451/67 |
| 4,094,198 A | * | 6/1978 | Moulinoux | 73/460 |
| 6,430,992 B1 | | 8/2002 | Goebel | |
| 6,502,453 B1 | * | 1/2003 | Kelm-Klager | 73/146 |
| 6,871,543 B2 | * | 3/2005 | Rothamel | 73/462 |
| 6,929,442 B2 | * | 8/2005 | Ferrari et al. | 414/426 |
| 2004/0003661 A1 | * | 1/2004 | Rothamel | 73/462 |
| 2004/0083810 A1 | | 5/2004 | Racine | |

FOREIGN PATENT DOCUMENTS

| | | |
|---|---|---|
| DE | 17 73 565 U | 9/1958 |
| DE | 197 41 751 A1 | 3/1999 |
| EP | 1 108 204 A1 | 6/2001 |
| EP | 1 724 563 A | 11/2006 |
| GB | 945072 | 12/1963 |
| GB | 2 153 095 A | 8/1985 |

OTHER PUBLICATIONS

European Search Report issued in European Patent Application No. EP 08008620.0 dated Oct. 24, 2008.

* cited by examiner

*Primary Examiner* — Harshad Patel
(74) *Attorney, Agent, or Firm* — McDermott Will & Emery LLP

(57) ABSTRACT

An apparatus for measuring forces generated by an unbalance of a vehicle wheel, comprising a horizontally oriented measuring shaft (1) which is supported rotary about its shaft axis (2) in a rotary mounting (3) on a stationary machine frame (4) and which is adapted that a vehicle wheel (5) is fixed onto it for the measurement operation, wherein the measuring shaft (1) is movably guided in a vertical direction on the stationary machine frame (4) between a first vertical position in which the measuring operation is conducted and a second vertical position in which the shaft axis is brought into alignment with a wheel axis (6) of the uprightly positioned vehicle wheel (5).

10 Claims, 6 Drawing Sheets

Figure 1:
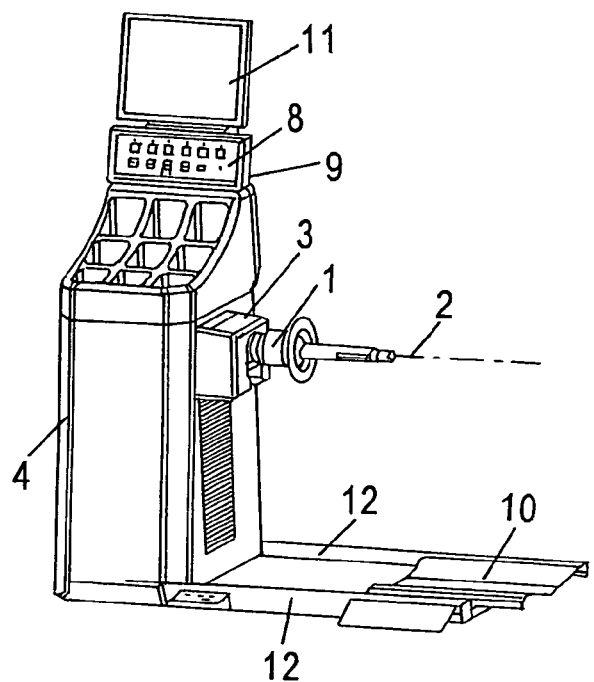

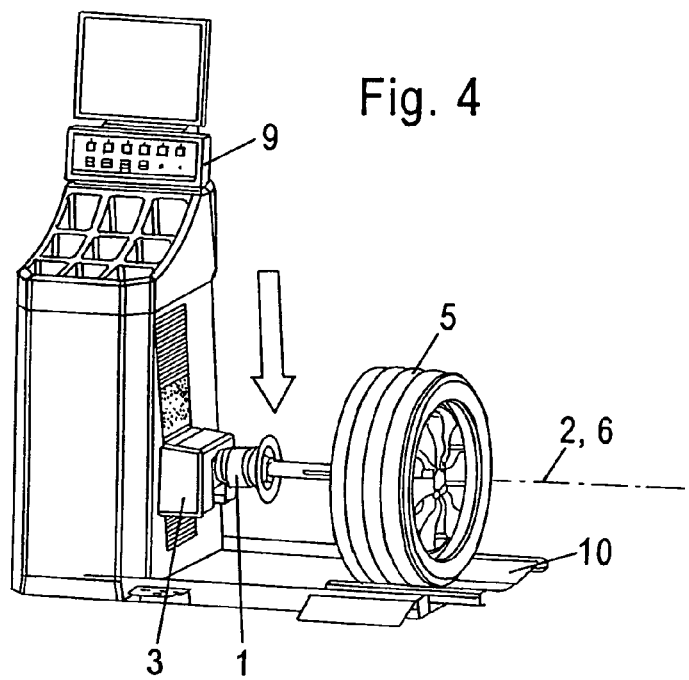
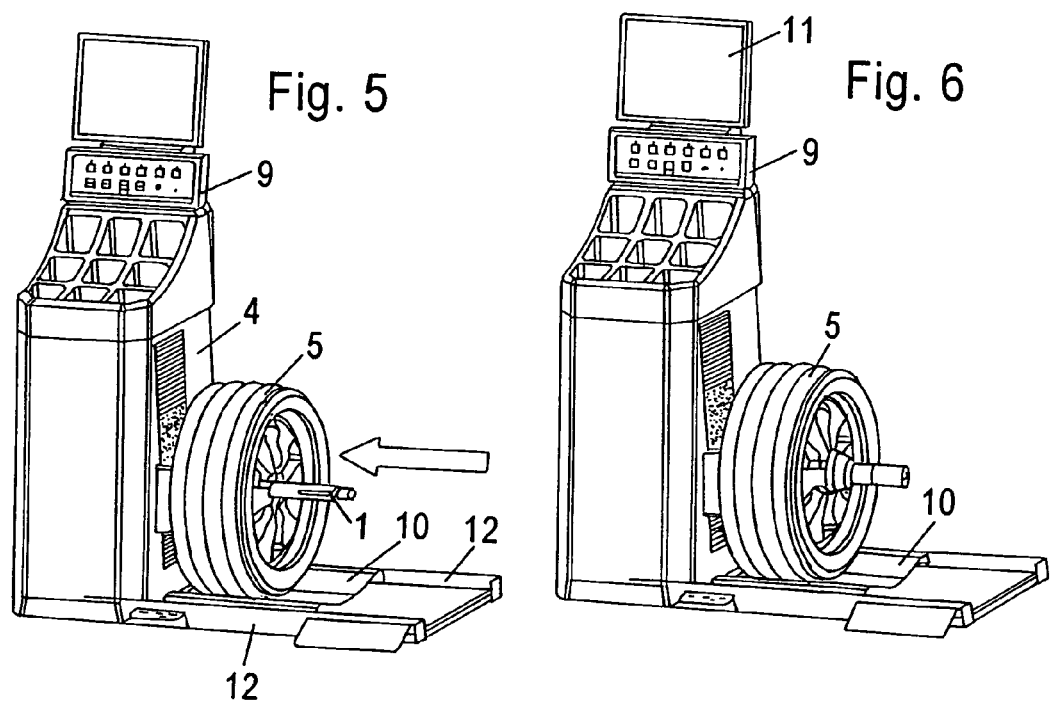

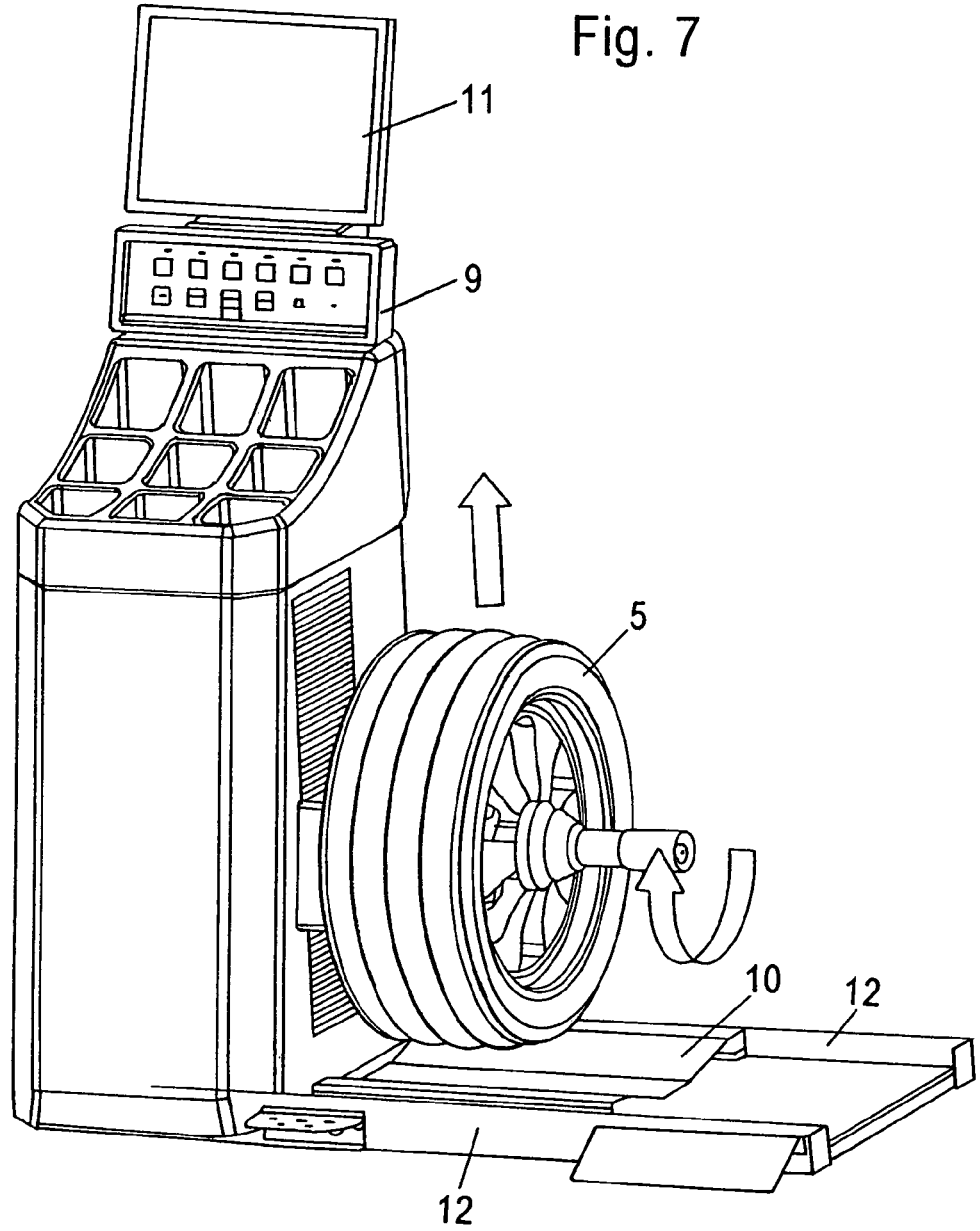

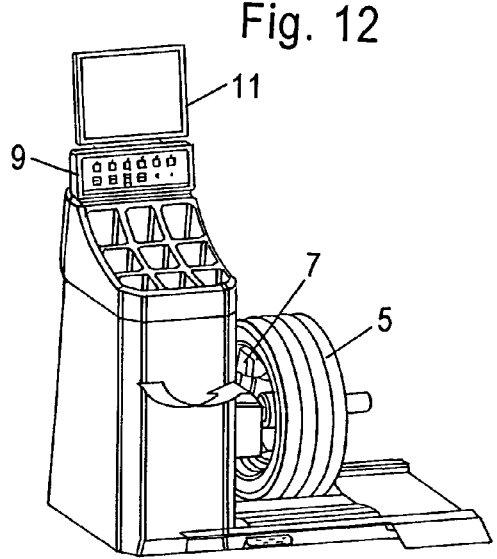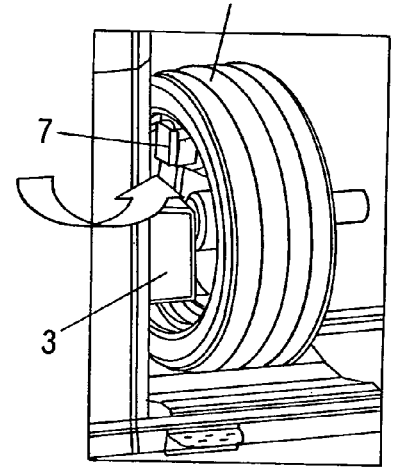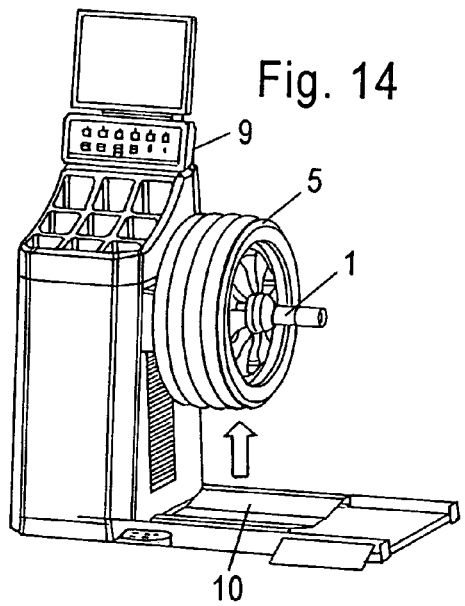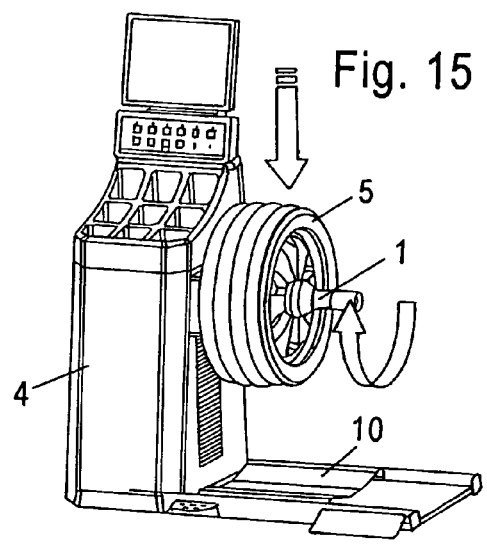

APPARATUS FOR MEASURING FORCES GENERATED BY AN UNBALANCE OF A VEHICLE WHEEL

The invention concerns an apparatus for measuring forces generated by an unbalance of a vehicle wheel comprising the features of the preamble of claim 1. Such an apparatus is known from US 2004/0083810 A1. A further apparatus is known from EP 1 108 204 B1 and includes a horizontally oriented measuring shaft which is supported rotary about its shaft in a rotary mounting on a stationary frame. The free end of the measuring shaft is adapted that a vehicle wheel is fixed onto it for the measurement operation.

DE 1 773 565 shows a balancing apparatus with a shaft axis, the shaft axis is movably guided in a vertical direction.

Furthermore, U.S. Pat. No. 3,824,862 A1 discloses a balancing apparatus with a shaft axis being movably guided.

A movable machine for determining the imbalance of a wheel is shown in GB 2 153 095 A. The shaft supporting the wheel is movably guided upwards and downwards in a vertical direction.

In the known wheel balancers the measuring shaft is arranged in a fixed level above the bottom and the vehicle has to be lifted manually fixing it onto the measuring shaft for the measurement operation. After the measurement operation, the vehicle wheel has to be lowered manually from the measuring shaft.

The problem to be solved by the invention is to provide an apparatus with which the fixing of the vehicle wheel onto the measuring shaft and the removal of the vehicle wheel from the measuring shaft after the measurement operation can easily performed. The problem is solved by the features of claim 1 and the sub-claim characterizes advantageous modifications of the invention.

The invention provides an apparatus for measuring forces generated by an unbalance of a vehicle wheel, comprising a horizontally oriented measuring shaft which is supported rotary about its shaft axis in a rotary mounting on a stationary machine frame. Onto the shaft a vehicle wheel can be fixed for the measurement operation during which the forces generated by the wheel unbalance are measured.

The measuring shaft is movably guided in a vertical direction on the stationary machine frame between a first vertical position in which the measuring operation is conducted and a second vertical position in which the shaft axis is brought into alignment with a wheel axis of the uprightly positioned vehicle wheel on the bottom or on a footboard.

The positioning of the measuring shaft in the second position or the movement of the measuring shaft to the second position can be controlled in dependence of the dimensions, particularly the diameter, of the vehicle wheel. For determining the dimensions of the vehicle wheel, a data entry device is provided to scan the vehicle wheel and to transfer the scanned dimension data of the vehicle wheel to a control device. In dependence of the wheel dimensions the control unit controls the movement of the measuring shaft.

The data entry device can be designed to sense the dimensions of the vehicle wheel in a mechanical manner, for example by a gauge, or in a contact less-manner, for example by an optical scanner. Further, it is possible to use a wireless data entry device which works on the basis of a gyroscope or accelerometer as described in U.S. Pat. No. 6,315,062 B1 for detecting the location of a boring tool. The data entry device can be provided also on the housing of the wheel balancer and can be adapted to receive the manually fed dimension data and transmit them to the control device.

Additionally, a foot board onto which the uprightly positioned vehicle wheel can be placed on the bottom and can be slidably guided parallel to the horizontally oriented measuring shaft close to the sidewall of the balancer housing.

The distance of the first vertical position of the measuring shaft from the its second vertical position is determined such that the vehicle wheel can be rotated for the unbalance measurement operation.

The measuring shaft is designed to be moved particularly under control of the control unit, to a third vertical position above its first position to perform the balancing operation on the vehicle wheel after the measurement operation.

After the vehicle wheel has been balanced, the measuring shaft can be controlled to be lowered to its second position.

During the movement of the measuring shaft from its first position in which the measurement operation has been conducted to the third position the vehicle wheel is rotated into the angular correction position for performing the balancing operation on the vehicle wheel. The control unit controls the rotation of the measuring shaft onto which the to be balanced vehicle wheel is fixed.

During the movement of the measuring shaft and of the thereon fixed vehicle wheel to the second position a check spin can be performed to check the quality of the balancing operation which has been performed on the vehicle wheel. After the completion of the wheel balancing, the control unit can control the movement of the measuring shaft and of the thereon fixed vehicle wheel to the lower second position.

The FIGS. 1 to 19 show an embodiment of the invention in different operation conditions.

The shown embodiment comprises a horizontally oriented measuring shaft 1 which is supported rotary about its shaft axis 2 in a rotary mounting 3 on a stationary machine frame 4 or machine housing.

The rotary mounting 3 can include force transducers for measuring forces which are generated by the unbalance of a vehicle wheel 5. Such an arrangement is disclosed for example in EP 1 108 204 B1. The free end of the measuring shaft 1 is designed for a centred fixing of the vehicle wheel 5 onto the measuring shaft 1. Within the machine housing, a computerized control unit 9 is provided. The control unit 9 is electrically connected with the force transducers and controls the not shown electric motor for rotating the measuring shaft in a well known manner. The control unit 9 is further connected to an electrically driven lifting device which can be designed as a spindle drive or the like and which is mechanically connected with the rotary mounting 3 for the vertically movement of the measuring shaft 1 as will be explained below.

FIG. 1 shows the embodiment of the wheel balancer in an initial condition in which a foot board 10 is placed in an initial position on a guiding device 12 along which the foot board 10 can be moved. The guiding device 12 extends parallel to the measuring shaft 1 and is positioned on the bottom and can be fixed to the machine frame 4.

Figure 2:
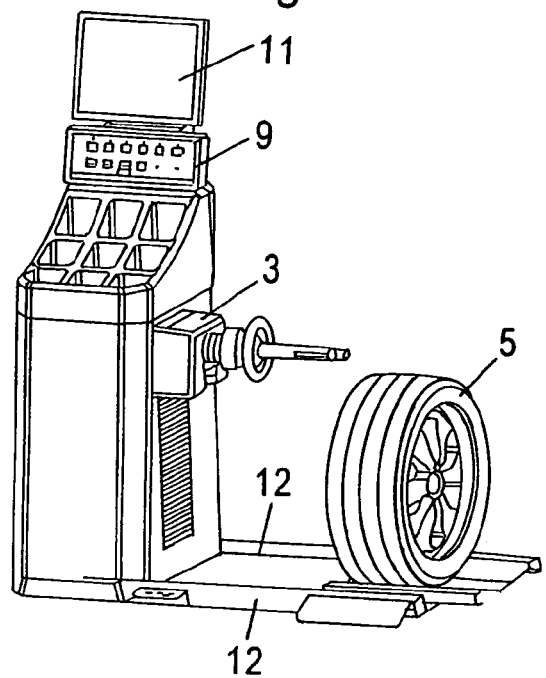
Figure 3:
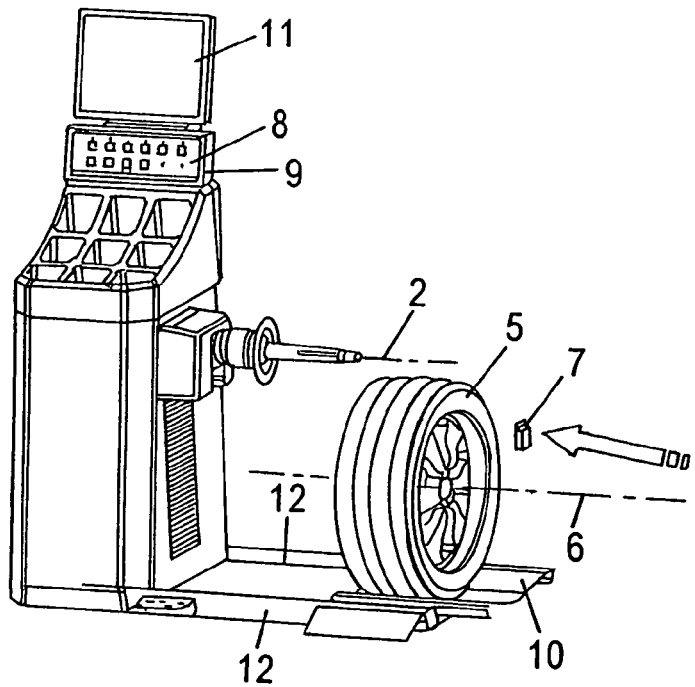
Figure 8:
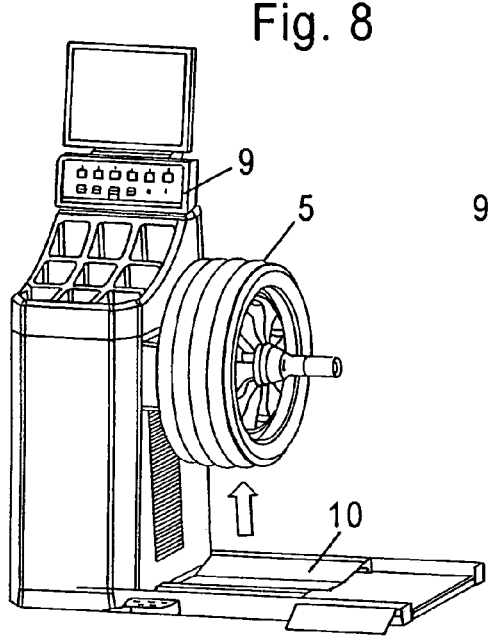

The vehicle wheel 5 which should be balanced can be arranged in upright position onto the foot board 10, as shown in FIG. 2. The foot board 10 and the vehicle wheel 5 are arranged in the initial position in distance which allows the lowering of the measuring shaft 1 from an upper position in FIGS. 1-3 to a lower position in the level of a wheel axis 6, as will be explained below. As shown in FIG. 3, the dimensions of the wheel 5, for example which, diameter, particularly which of the wheel rim and diameter of the wheel (rim/tyre assembly), are detected by a data entry device 7. The data entry device 7, shown in FIG. 3, is a wireless data entry device which can work on gyroscope basis or accelerometer basis.

The dimension data sensed by the data entry device 7 are transmitted to the control unit by radio frequency (RF) transmission. For detecting the required wheel dimension, the data entry device is brought into contact with respective points of the wheel. Further, it is possible to use a data entry device 8 on the machine housing to input manually the dimension data of the vehicle wheel 5 for transmission to the control unit 9.

In dependence of the known wheel dimension, particularly its wheel diameter the measuring shaft is lowered to a position in which the shaft axis 2 and the wheel axis 6 are aligned (FIG. 4). The positioning of the shaft axis 2 in alignment with the wheel axis 6 can be controlled by the control unit 9

Then, the vehicle wheel 5 is moved on the sliding foot board 10 toward the machine frame 4 (machine housing) to clamp the vehicle wheel 5 onto the measuring shaft 1 (FIGS. 5 and 6). The movement of the foot board 10 is guided by the guiding device 12 parallel to the extension of the measuring shaft 1.

After the vehicle wheel 5 has been fixed on the measuring shaft 1, the measuring shaft 1 is lifted to a position (FIG. 7) in which the measurement operation is performed. The minimum stroke from the lower position (FIG. 6) to the position in FIG. 7 is controlled such that the vehicle wheel 5 can rotate during the rotation of the vehicle wheel 5. The forces generated by a wheel unbalance are measured and respective correction values are shown on the display screen 11. If the measurement result indicates that the measured vehicle wheel 5 is balanced, the measuring shaft 1 is lowered so that the vehicle wheel 5 is brought back to the foot board 10, as shown in FIG. 16.

Figure 9:
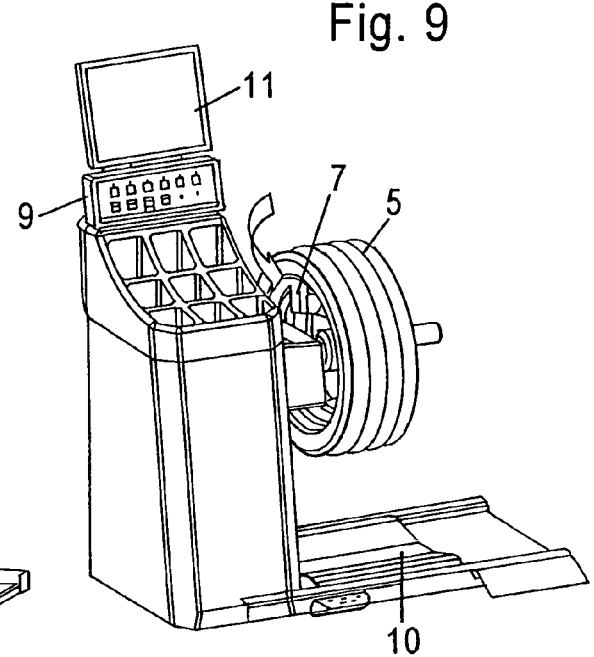
Figure 10:
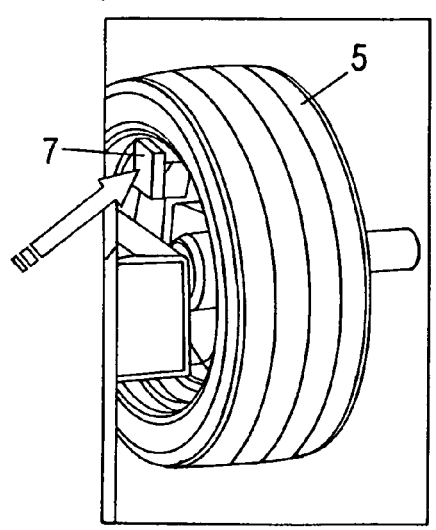
Figure 11:
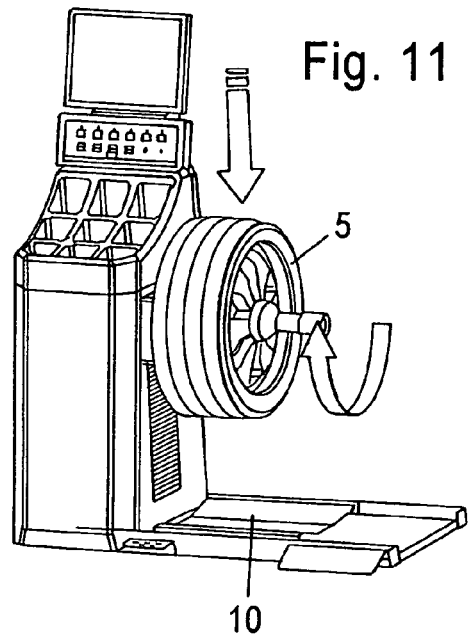

If the measurement result indicates that the measured vehicle wheel 5 must be balanced, the measuring shaft 1 and the thereon fixed vehicle wheel 5 are lifted to a position (FIGS. 8-10) in which the balancing operation can be performed. During the balancing operation the user can determine the position or positions particularly the plane or planes in which correction weights should be fixed to the vehicle wheel. As shown in FIGS. 9 and 10, the wireless data entry device 7 or another appropriate gauge or device can be used therefore. Calculation means of the control unit 9 calculates as well in dependence of the measured forces the value and angular position of the correction weight or the values and angular positions of the correction weights. After the correction weights have been applied to the vehicle wheel 5, a check spin of the vehicle wheel 5 is performed to verify that the vehicle wheel 5 has been balanced within the permitted tolerances (FIG. 11). The check spin can be conducted during the lowering of the vehicle wheel onto the foot board (FIG. 16).

The FIGS. 12-15 show another option. If the measurement results which are achieved during the measurement operation (FIG. 7) indicate that the vehicle wheel 5 has to be balanced, the user select the position or positions especially the plane position or plane positions in which the correction weight or the correction weights should be placed for the wheel balancing (FIGS. 12 an 13). The position of vehicle wheel 5 and of the measuring shaft 1 is the same position (FIG. 7) in which the measurement operation is performed. The position selection can be carried out before or after the measurement operation. Calculation means of the same wireless data entry device 7 or another suitable device can be used as for the operation conditions in FIGS. 9 and 10. The control unit 9 calculates the values of the weight amount and of the angular correction position in which the correction weight or correction weights should be placed on the vehicle wheel 5. Then the measuring shaft 1 and the vehicle wheel 5 are lifted to the position (FIG. 14) in which the balancing operation is performed by fixing the correction weight or correction weights in the respective angular position or positions. During the lifting procedure the measuring shaft 1 can be rotated to bring the vehicle wheel 5 in the correct angular position in which the weight or weights should be applied, for example in the 12-hour-position of the wheel. After the completion of the balancing operation, a check spin on the vehicle wheel is carried out to verify whether the vehicle wheel 5 has been balanced sufficiently (FIG. 15). The check spin can be performed also during the lowering of the vehicle wheel onto the foot board 10 (FIG. 16).

Figure 16:
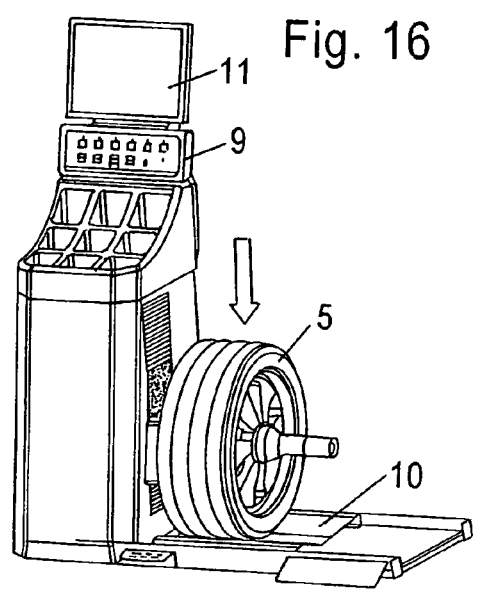
Figure 17:
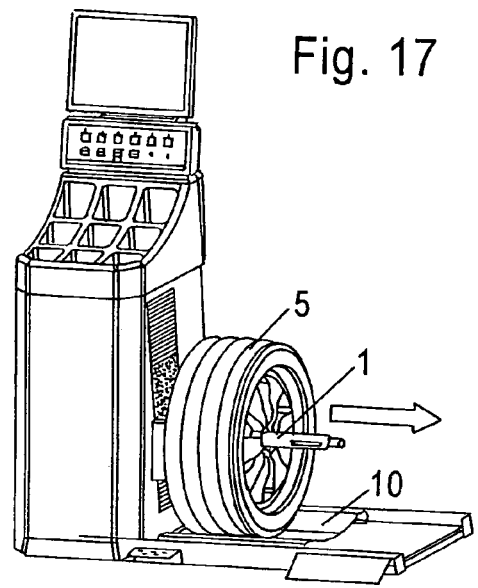
Figure 18:
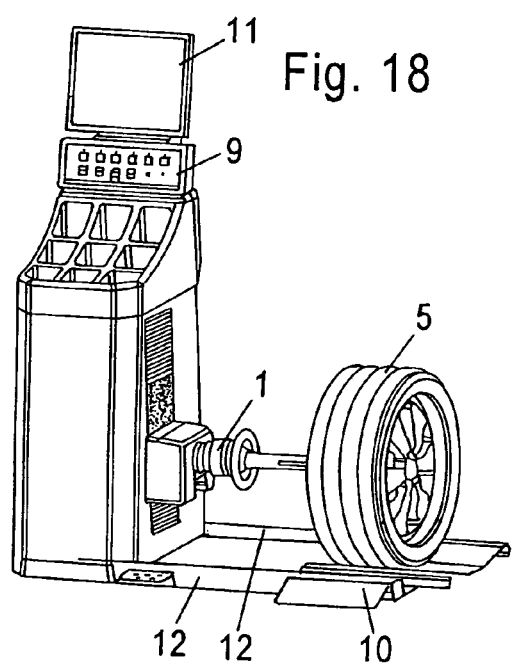
Figure 19:
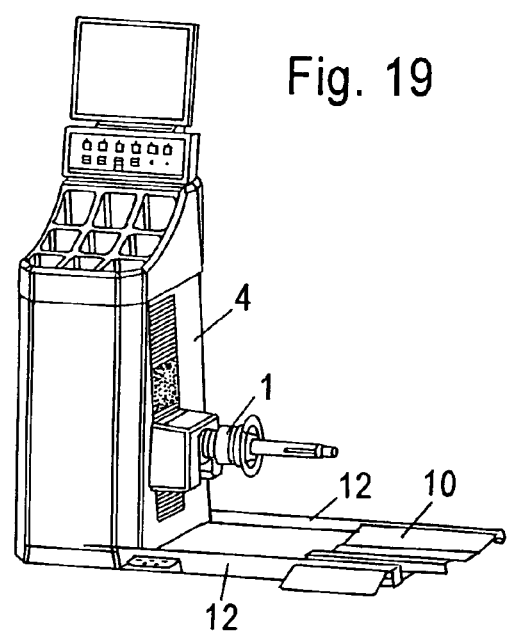

If the vehicle wheel 5 is balanced, it is lowered to the foot board 10, as shown in FIG. 16. The vehicle wheel 5 is released from the fixation on the measuring shaft 1 (FIG. 17) and moved away by means of the foot board 10 from the measuring shaft 1 (FIG. 18). The foot board 10 is guided parallel to the measuring shaft 1 along the guiding device 12 (FIG. 18) in sliding manner. Finally, the vehicle wheel 5 is removed from the foot board (FIGS. 19).

REFERENCE LIST 1 measuring shaft
2 shaft axis
3 rotary mounting
4 machine frame (machine housing)
5 vehicle wheel
6 wheel axis
7 data entry device (wireless device)
8 data entry device (keyboard)
9 control unit
10 foot board
11 display screen
12 guiding device

The invention claimed is:

1. An apparatus for measuring forces generated by an unbalance of a vehicle wheel, comprising a horizontally oriented measuring shaft (1) which is supported rotary about its shaft axis (2) in a rotary mounting (3) on a stationary machine frame (4) and which is adapted such that a vehicle wheel (5) is fixed onto it for a measurement operation, wherein the measuring shaft (1) is movably guided in a vertical direction on the stationary machine frame (4) between a first vertical position in which the measurement operation is conducted and a second vertical position in which the shaft axis is brought into alignment with a wheel axis (6) of the uprightly positioned vehicle wheel (5), characterized in that the measuring shaft (1) is designed to be moved to a third vertical position above its first position to perform a balancing operation on the vehicle wheel (5) and a control unit (9) controls the rotation of the measuring shaft (1) onto which the to be balanced vehicle wheel (5) is fixed during the movement of the measuring shaft (1) from its first position to its third position such that the vehicle wheel (5) is rotated into an angular correction position for performing the balancing operation on the vehicle wheel (5).

2. The apparatus according to claim 1, characterized in that the positioning of the measuring shaft (1) in the second position is controlled in dependence of the dimension, particularly the diameter of the vehicle wheel (5).

3. The apparatus according to claim 1, characterized in that a data entry device (7,8) is adapted to transfer the dimensions of the vehicle wheel (5) to the control unit (9) for controlling the movement of the measuring shaft (1).

4. The apparatus according to claim 3, characterized in that the data entry device (7) is designed to sense the dimensions of the vehicle wheel (5).

5. The apparatus according to claim 3, characterized in that the data entry device (8) is adapted to receive the manually fed dimension data.

6. The apparatus according to one of the claims 1 to 5, characterized in that a foot board (10) onto which the uprightly positioned vehicle wheel (5) can be placed is slidably guided parallel to the horizontally oriented measuring shaft (1).

7. The apparatus according to one of the claims 1 to 5, characterized in that the distance of the first vertical position of the measuring shaft (1) from its second vertical position is determined such that the vehicle wheel (5) can be rotated for the unbalance measurement operation.

8. The apparatus according to one of the claims 1 to 5, characterized in that, after the vehicle wheel (5) has been balanced, the control unit (9) is designed to control the measuring shaft (1) to be lowered to its second position.

9. The apparatus according to one of the claims 1 to 5, characterized in that the control unit (9) is designed to control the rotation of the measuring shaft (1) such that after the measurement operation and during the movement of the measuring shaft (1) to its second position a check spin is performed to check the quality of the balancing operation.

10. The apparatus according to one of the claims 1 to 5, characterized in that the control unit (9) is designed to control the measuring shaft (1) to be moved to its second position after completion of the wheel balancing.

* * * * *